United States Patent
Baumler et al.

(10) Patent No.: US 6,493,364 B1
(45) Date of Patent: Dec. 10, 2002

(54) BEAM SHUTTER FOR EXCIMER LASER

(75) Inventors: Jurgen Baumler, Osterode (DE); Ulrich Rebhan, Gottingen (DE); Markus Ritcher, Gottingen (DE)

(73) Assignee: Lambda Physik AG, Goettingen (DE)

( * ) Notice: Subject to any disclaimer, the term of this patent is extended or adjusted under 35 U.S.C. 154(b) by 0 days.

(21) Appl. No.: 09/475,775

(22) Filed: Dec. 30, 1999

Related U.S. Application Data
(60) Provisional application No. 60/137,869, filed on Jun. 7, 1999.

(51) Int. Cl.[7] .............................. H01S 3/123; H01S 3/08
(52) U.S. Cl. ......................... 372/15; 372/14; 372/107; 372/108
(58) Field of Search ..................... 372/14.15, 9, 107, 372/108; 250/498.1

(56) References Cited

U.S. PATENT DOCUMENTS

| | | | | |
|---|---|---|---|---|
| 4,006,691 A | * | 2/1977 | Kacir et al. | .................. 104/176 |
| 5,032,005 A | * | 7/1991 | Woodruff | ..................... 350/269 |
| 5,596,590 A | | 1/1997 | de Ruyter et al. | ............ 372/14 |

OTHER PUBLICATIONS

"New Beam Shutter for NovaLine Litho," *Technical Bulletin*, by Lambda Physik, Sep. 1998, 3 pages in length.
"Photodiode Tool." *Technical Bulletin*, by Lambda Physik, 1998, 1 page in length.

* cited by examiner

*Primary Examiner*—Paul Ip
*Assistant Examiner*—James Menefee
(74) *Attorney, Agent, or Firm*—Sierra Patent Group, Ltd.; Andrew V. Smith

(57) ABSTRACT

A beam shutter apparatus designed to handle high powered UV radiation is disclosed. The shutter includes a high reflectivity mirror mounted on a plate which can be rotated between a first position where the beam is reflected and redirected to a tool such as a beam dump and a second position where the beam is free to pass out of the laser, where the beam is free to pass out of the laser The shutter includes a support base with an angled upper surface upon which the mirror plate rests when in the second position. The support base has a beam path channel designed so that a beam can pass through the support base and out of the shutter when the mirrored plate is in the first position. The mirrored plate is rotated by a linkage, which is driven by an electrically powered actuator on a rotational magnet. The support base is machined out of a monolithic piece of metal allowing very high precision without the need for cumbersome alignment procedures.

15 Claims, 5 Drawing Sheets

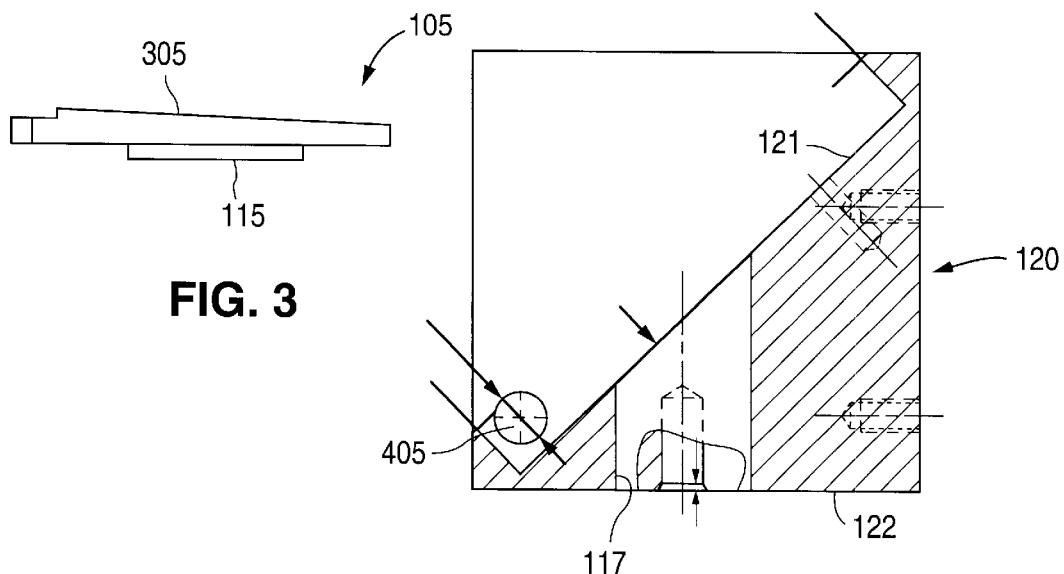
FIG. 3
FIG. 4
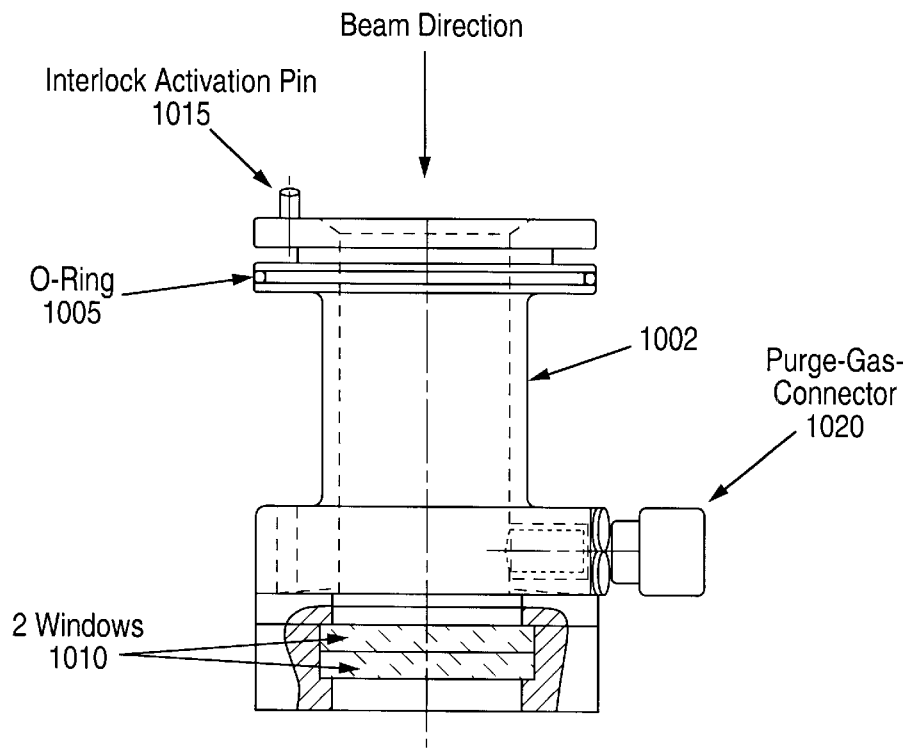
FIG. 10

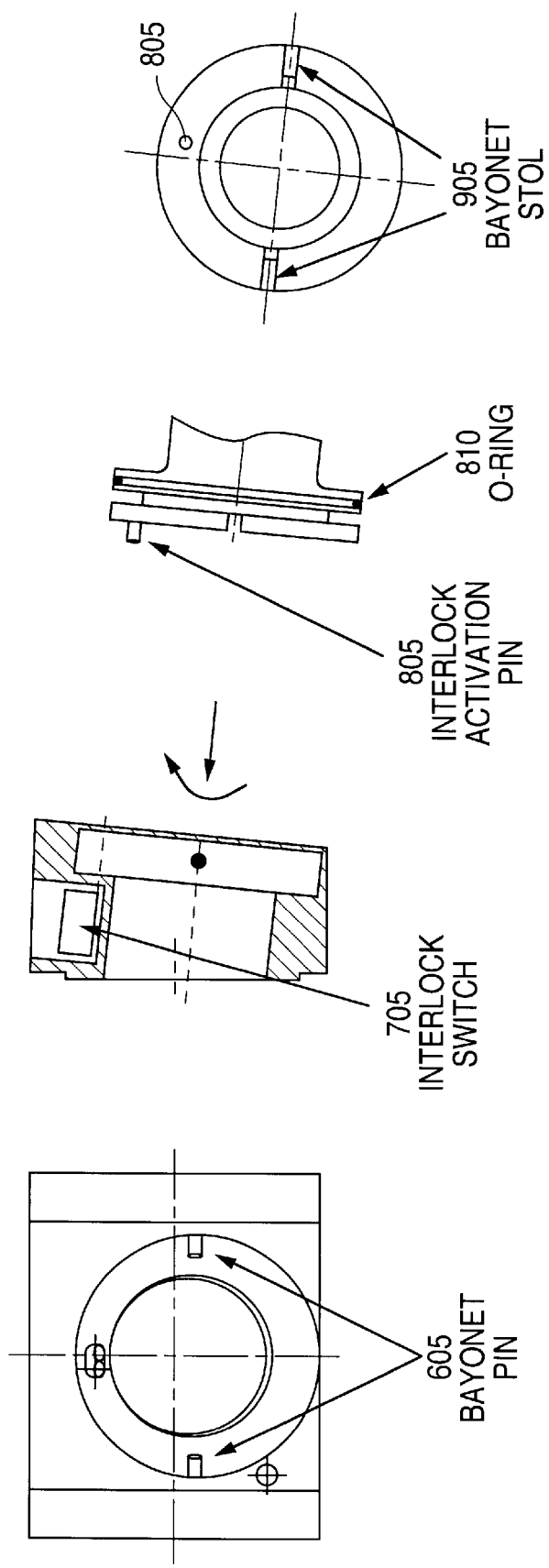

US 6,493,364 B1

BEAM SHUTTER FOR EXCIMER LASER

PRIORITY

This application claims the benefit of priority to U.S. Provisional Patent Application No. 60/137,869, filed June 7, 1999.

FIELD OF THE INVENTION

The present invention relates to a beam shutter designed for industrial excimer lasers including a rotating mirror for selectively opening and closing the beam path.

BACKGROUND OF THE INVENTION

High power lasers require laser shutters which can withstand up to 300 W output power. A prior art design consists of a large metal piece which can be pulled upwards out of the beam path by an electrically or pneumatically activated actuator. De-energizing the actuator results in closing the beam path by sliding down the metal piece. A common choice for the metal beamstop is an extruded aluminum heat sink guided by sliding rails or rod-roller bearings. For high power XeCL lasers it is advantageous to either plate the metal beam stop with copper or to use a solid copper beam stop. Copper has a lower ablation rate than aluminum and therefore contamination of laser and beam line optics is reduced. However, there are several disadvantages of this high power shutter design. First, the heavy metal beam stop results in slow opening and closing times. Further, the large heat load on the moving metal beam stop causes significant thermal expansion of the beam stop so that the sliding rails or rod-roller bearings of the beam stop must have large clearance to permit the up and down movement. Such large clearances are contradictory to precise shutter movement. In addition, the shutter is not light tight to the required extent because of the large required clearance between moving parts. Further, the removal of the large heat load requires a large opening for ventilation, which yields a design which cannot be integrated into a purged beam path with low losses of purge gas.

One state of the art beam shutter (U.S Pat. No. 5,596,590) has a linear slide base guided by a pair of rod-roller bearing supports. Making this shutter light tight requires precise alignment of the moveable mirror base relative to the shutter housing. Additionally, the pair of rod-roller bearing supports must be precisely aligned. The required precision is in the order of 0.1 mm. Low fit tolerances of all mechanical parts are mandatory. The precision alignment of the moveable mirror base and low fit tolerances are disadvantages to this type of shutter design. Therefore, it is desirable to have a shutter that achieves precision alignment for light tightness without cumbersome alignment procedures.

Another state of the art shutter has two metal blades that interrupt the beam path. This type of shutter is very fast, with opening and closing times of less than 100 ms. However, when the metal blades interrupt the laser, the laser power is partially reflected and partially absorbed by the metal blades. Consequently this type of design can handle only very low average power levels. Dielectrically coated metal blades increase the power handling capability of this shutter type significantly. However, in the ultraviolet spectral range, the coatings are not perfect and a portion of UV laser beam will still reach the metal blades. Therefore, the shutter can not handle the required level of UV light. Consequently it is desirable to have a beam shutter that can handle high levels of UV light.

Also, there is a state of the art shutter that consists of a hollow metal cylinder preferably made of a metal with low specific gravity rotated by an electrically powered actuator. The hollow cylinder has two rectangular openings symmetrically positioned to the cylinder axis. Depending on the rotational position of the cylinder, the laser beam could either pass through the two rectangular openings or be blocked by the solid section of the cylinder. The thin wall metal cylinder has a low moment of inertia which results in a fast opening and closing time of about 100 ms. However the disadvantage of this shutter is the low power handling capability and the high level of stray light caused by the beam reflected off the solid section of the hollow cylinder. It is more desirable to have a shutter that has a high power handling capability and is light tight.

SUMMARY OF THE INVENTION

An object of the present invention is to provide a beam shutter which can handle high powered UV radiation.

It is a further object of the present invention to provide a beam shutter that does not require precise alignment of moveable parts.

It is a another object of the present invention to provide a beam shutter that is leak tight regarding purge gas, making purge gas loss extremely low.

The objects and features of the present invention are realized by the use of a beam shutter having a high reflectivity mirror mounted on the top side of a plate which is rotated into the beam path in order to interrupt the beam and reflect it to a side port, to which a beam dump or diagnostic tool is attached. The beam dump or diagnostic tools are attached to the side port by rotation using a bayonet-type fitting.

The shutter has a base including an angled upper surface for supporting the plate and mirror at an angle for reflecting the laser beam to the side port. The shutter base has a beam channel through it to allow a beam to pass unimpeded when the plate and mirror are rotated to an open position away from the base. The plate carrying the mirror is equipped with a labyrinth seal on its underside to achieve light tightness when positioned on the shutter base.

Because the upper surface of the shutter base is machined at a predetermined angle, there is no need for precise motor control for positioning the mirror for reflection. The mirrored plate is simply rotated into contact with the upper surface of the shutter base. The labyrinth seal under the plate fills and seals the beam channel in the shutter base for light tightness. When no reflection is desired, the mirror is rotated out away from the channel an amount sufficient to allow the beam to pass.

The plate is connected to a linkage, which rotates the plate and mirror into and out of position for reflecting the beam. The linkage is comprised of several members connected by lubricant free bearings, and is operated by a rotational magnet, which is attached to the shutter housing. The design of the shutter base and linkage eliminates the requirement for the precision alignment of mechanical parts. Also the shutter body including the bearing seats are machined out of a monolithic piece of metal, which further allows precision without other cumbersome alignment features.

BRIEF DESCRIPTION OF THE DRAWINGS

FIG. 3 is a top view of the mirrored plate with a labyrinth seal on the underside thereof.

FIG. 4 is a cross sectional view of the shutter support base.

FIG. 6 is an end view of the shutter side port.

FIG. 7 is a cross sectional view of the shutter side port.

FIG. 8 is a side view of the connector portion of the beam dump.

FIG. 9 is an end view of the connector portion of the beam dump.

FIG. 10 is a side view of a view port which is an alternative attachment for the side port of the shutter and can be used to visually inspect the beam upon reflection.

DETAILED DESCRIPTION OF THE PREFERRED EMBODIMENT

Figure 1:
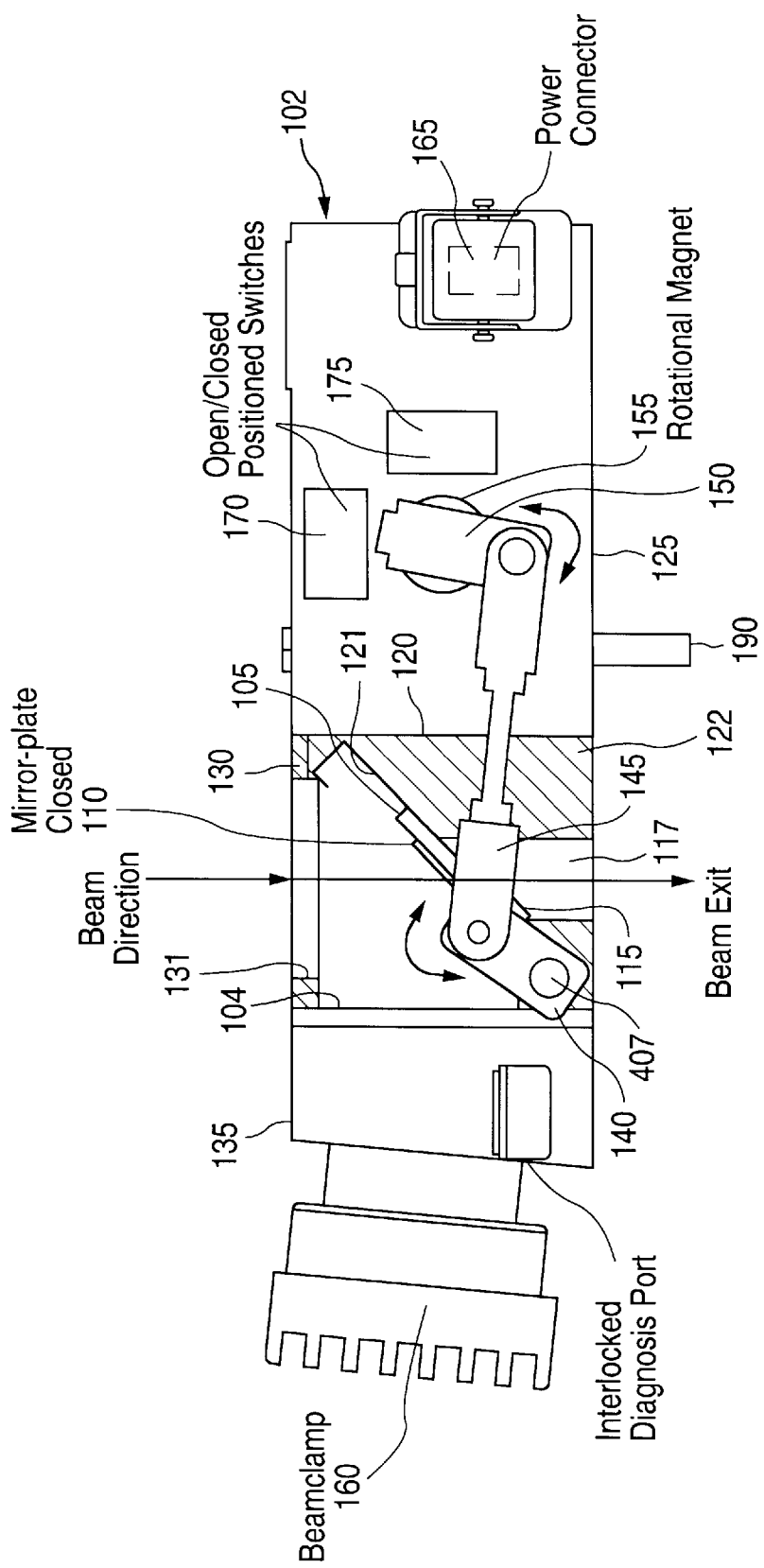
FIG. 1 is a top view illustrating the beam shutter in its closed position.
Figure 2:
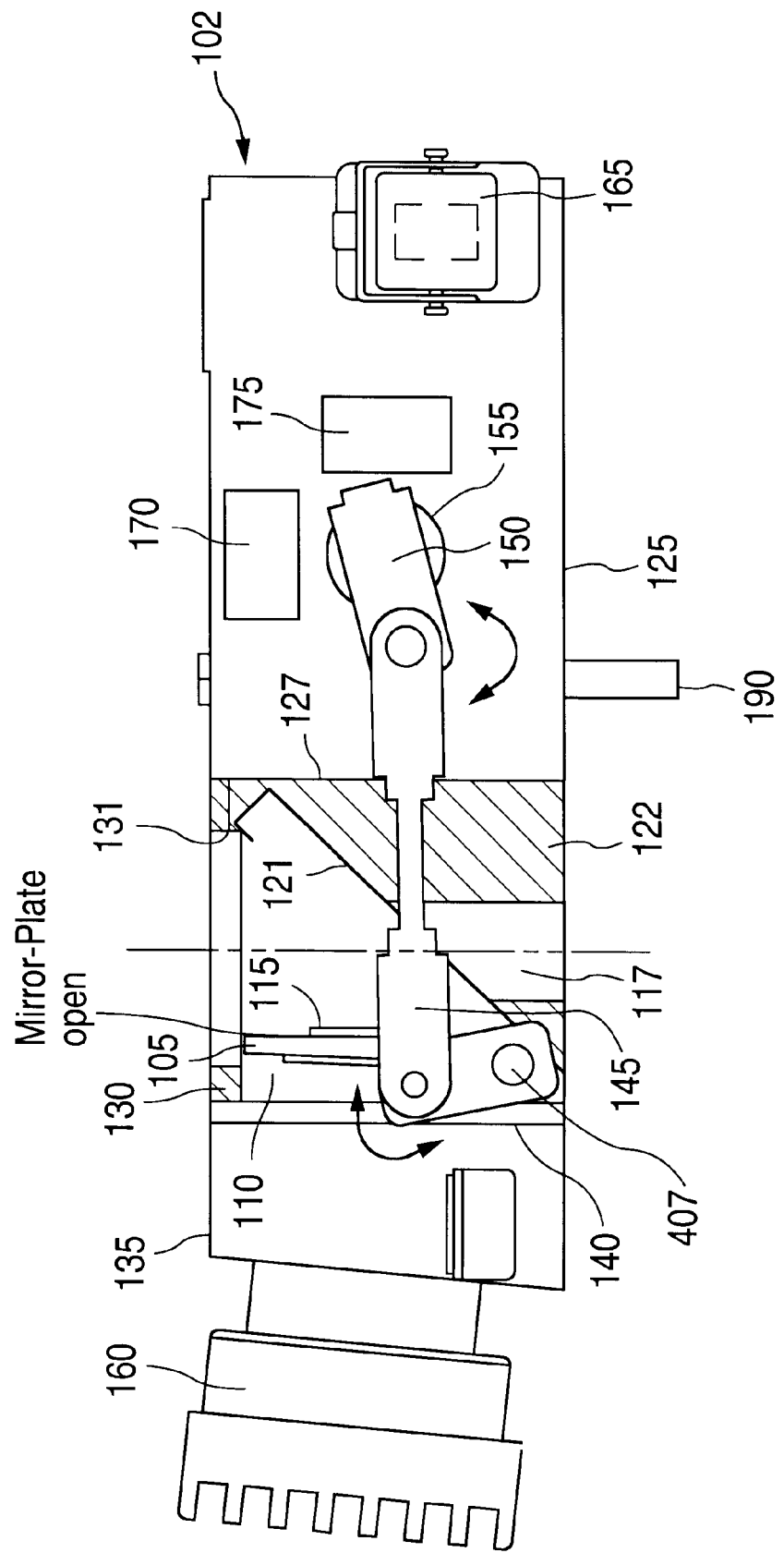
FIG. 2 is a top view illustrating the beam shutter in its open position.

Referring to FIGS. 1 and 2, a preferred embodiment of the beam shutter device of the present invention is disclosed. FIG. 1 shows the beam shutter in its closed position, and FIG. 2 shows the beam shutter in its open position.

The beam shutter includes a monolithic support base 120 with an attached electronics housing 102 and an attached adapter port 104. As best seen in FIG. 4, the support base 120 is machined from a monolithic piece of metal. The upper surface of support base 120 is machined at a 45 degree angle to define an entry face 121. A beam channel 117 is machined through the support from the entry face 121 to the exit face 122. An adapter flange 130 having an opening 131 is mounted on top of support base 120.

When the laser is actively treating a workpiece, the laser beam enters the shutter through the opening 131 and passes through channel 117 in support base 120 to reach the workpiece (FIG. 2). When it is desired to block the beam, the mirror plate 105 is moved into the position shown in FIG. 1 and the light beam is intercepted by mirror 110 and directed to the left side exit port 135. The beam may be captured by a beam dump 160 or other diagnostic tools as discussed below.

A highly reflective mirror 110 is mounted on the front side 305 of plate 105. In addition, and as best seen in FIG. 3, a labyrinth seal 115 is attached to the rear side of plate 105. When the mirrored plate 105 is in the closed position (FIG. 1), the labyrinth seal 115 fills the beam channel 117 of the support base 120 to make the assembly light tight. The mirror plate is mounted to the support base via a bearing 407 mounted in bearing seat 405.

The movement of mirrored plate 105 is controlled by a motor driven linkage. The linkage consists of three links 140, 145, and 150 that are attached in a hinge-like manner. Link 150 is connected to a rotational magnet 155 which is mounted on the housing 102. Link 140 is connected to bearing 407. The rotational magnet 155 has a rotational drive motor which rotates the linkage thus moving the mirrored plate 105 between the two positions shown in FIGS. 1 and 2. The links 140, 145, and 150 of the linkage as well as the rotational magnet 155 are connected with lubricant-free bearings. Since the beam shutter uses lubricant free bearings and does not use plastics which expel gas under high UV radiation conditions it avoids optics contamination and is fully compatible with UV radiation. The beam shutter also has open and closed position sensors 170 and 175 located on each side of link 150 of the linkage.

This shutter can be easily integrated into an inert gas purged beam path. Such a beam path is disclosed in commonly owned U.S. patent application Ser. No. 09/343,333, filed Jun. 30,1999 and incorporated herein by reference. The shutter is leak tight regarding purge gas by design. The leakage rate is less than 5 liters per second at a differential purge gas pressure of 100 Pascals. Therefore, purge gas loss is extremely low.

The beam dump can be provided with a purge gas port (not shown). Depending on the customer's design of the purged beam path, this port can be used to feed purge gas into the shutter and the entire beam path. If the gas inlet of the purged beam line is located in the customer's system, and the customer wishes to flush his beam line in the direction of the laser beam, then an adjustable orifice can be attached to the purge gas port of the heat sink and controlled purge gas leakage rate can be adjusted. This allows the user to adjust the purge gas flow rate to the requirements of the user's beam path system. Purging of the beam path is of special importance for 194 nm (ArF) and 157 nm ($F_2$) lasers.

As illustrated in FIGS. 1 and 2, a beam dump or other diagnostic tool can be mounted to the side exit port 135 of the shutter housing. In the preferred embodiment, a bayonet type connector is used. The connector assembly is best seen in FIGS. 6 to 9 where FIGS. 6 and 7 are views of the exit port itself, while FIGS. 8 and 9 are views of the connector portion of the beam dump or other tool.

As seen therein, the bayonet connector on the exit port includes a pair of opposed pins 605. These pins mate with slots 905 in the beam dump. During the assembly procedure, the user will align the pins with the slots, insert the tool and then rotate the tool about 15 degrees to lock it in place. The bayonet mount is easy to use and leak tight for both light and gas.

In the preferred embodiment, the exit port is provided with an interlock switch 705. When no tool is mounted on the exit port, this switch will send a signal to the laser electronics preventing the laser from firing. In this manner, laser light will not be inadvertently reflected out into the environment. The beam dump includes an interlock activation pin 805. When the beam dump is mounted, pin 805 engages the switch 705, overriding the interlock and allowing the laser to operated.

During normal operation of the laser, the shutter beam dump is attached to the side port 135. For laser radiation levels up to a few tens of Watts, an air cooled beam dump is sufficient. The shutter of the subject invention is designed to handle much higher power levels, easily up to 300 Watts. When using such higher powers, a water cooled beam dump is desired.

Figure 5:
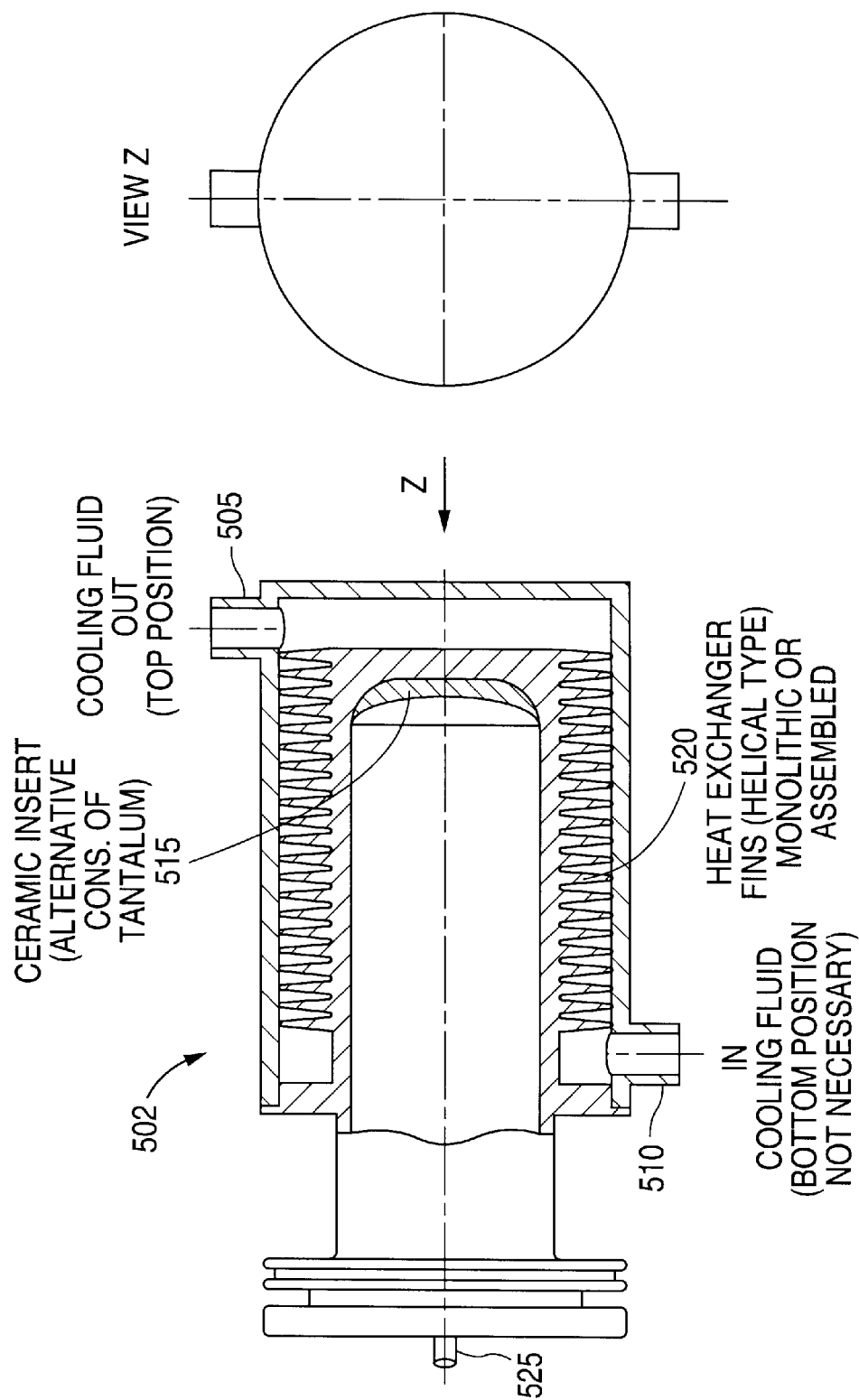
FIG. 5 depicts a cross sectional view of a fluid cooled beam dump.

A preferred version of a water cooled beam dump 502 is shown in FIG. 5. This dump consists of a finned copper or aluminum profile as a heat sink. A special radiation absorbing plate 515 may be attached to the heat sink. This insert should be made of a material with low sputter rates. Ceramics, such as aluminum oxide, or a metal such as tantalum, can be used to form the insert 115 for use with the UV laser wavelengths. For an XeCl laser, copper can be used as the insert. The insert is shaped so that back scattering is minimized. Water is circulated past the heat exchanger fins 520 through inlet 510 and outlet 505.

Referring now to FIG. 10, a view port 1002 is shown. In some instances a visual inspection of the beam profile is desired. In this case, the beam dump can be removed from the shutter and the view port can be mounted in its place. The view port 1002 preferably includes a pair of glass plate windows 1010, to allow visual inspection of the laser beam profile under Class I laser radiation conditions. When exposed to UV radiation, fluorescent light is generated by the laser beam in the glass plates. The fluorescent intensity depends on the local laser beam power and therefore the beam profile can be visually inspected. Depending on the customer's design of the purged beam path, a purge gas connector 1020 can be used to feed gas into the shutter and the entire beam path.

In addition to the view port, other alternative diagnostic tools are available for attachment to the diagnostic port. Precise analysis of the laser beam is possible with a CCD camera based laser beam profiler. It allows near field and far field beam profile measurement under Class I laser radiation conditions. The CCD camera also allows measurement of beam pointing (far field) and positional (near field) stability. A power meter could also be attached for online power calibration of the energy monitor. A photo diode unit with integrated, adjustable attenuators can be attached for temporal pulse shape measurements. Moreover, other diagnostic tools like etalon or grating based spectrometers or wavemeters can be attached. The information of the diagnostic tools can be either read by external equipment, or the information can be fed into the laser control PC for online performance diagnosis by the laser itself.

In addition to the position sensors 170 and 175, status LED's (not shown) can be mounted on the electronics housing 102 for easy functional checks and easy trouble shooting. The shutter may also be equipped with a manual external shutter (not shown), the position of which is monitored by a sensor located in tube 190. If the manual shutter is closed, the interlock will close the internal shutter automatically. This avoids high thermal load on the manual shutter which is not designed for high average power load. The shutter status information is transferred to the laser's computer system and is additionally indicated by LEDs on the shutter itself.

The mechanical design of the subject beam shutter is inherently reliable. Difficult adjustment and alignment procedures of the moving parts are not required. The fact that the shutter support 120 is machined out of a single piece of metal allows a transfer of the precision achievable with modem machine tools to the shutter without cumbersome alignment procedures. The obtainable precision of the important parts of the shutter body is better than 0.05 mm.

In particular, the accuracy of placement of the mirror in the closed position of FIG. 1 is derived from the accurate machining of the angle of the entry face of the support base rather than the controlled stop position of the rotational magnet. In the illustrated embodiment, this angle is set of 45 degrees but could be any nonnormal angle, such as between 10 and 80 degrees. The stop point for the open position of the mirror in FIG. 2 is not critical because the mirror only needs to be moved out of the beam path.

The reliability of the beam shutter has been proven in long term tests. There was no mechanical abrasion detectable after several million opening and closing cycles. Moreover, the bearings were fully operable after all of the testing. The mechanical precision of the shutter was also excellent after long term testing. This precision is a precondition for light leak tightness and purge gas tightness. The mean time between failure for the shutter design is at least 20,000 hours under the typical opening and closing cycle conditions of lithography scanner operation. In addition, opening and closing times are very fast and can occur in less than 500 milliseconds.

The shutter is designed in a way that moving mechanical parts are not accessible. This is a safety advantage for the operator. Additionally, unauthorized shutter blocking in the open position by standard tools is prevented.

Maintenance or service actions on the laser might require manual shutter operation. The shutter has a socket (not shown) located at the end of electronics housing 102 near the power connector 165. For manual shutter activation, an activation plug can be inserted into the socket and the shutter will open.

The shutter also fulfills the relevant laser radiation standards. The shutter is sufficiently tight regarding laser radiation and scattered laser light and fulfills class I laser conditions under all circumstances.

Various other modifications and alterations in the structure and use of this invention will be apparent to those skilled in the art without departing from the scope and spirit of the invention. Although the invention has been described in connection with the specific preferred embodiments, it should be understood that the invention as claimed should not be unduly limited to any specific embodiment. It is intended that the following claims define the scope of the present invention and that structures and methods within the scope of these claims and their equivalents are covered thereby.

What is claimed is:

1. A beam shutter for controlling the passage of a high-power laser beam, comprising:

a support base fixed in relation to a beam path of the laser beam, said support base including an entry face, an exit face and a channel formed between the entry and exit faces for permitting the laser beam to pass therethrough;

a mirror support including a mirror face and an opposing face opposite the mirror face, said mirror support being rotatable between first and second positions, wherein in the first position, the opposing face of the mirror support forms a light-tight seal with the entry face of the support base over the channel, and wherein in the second position, the mirror support is rotated entirely to one side of the beam path of the laser beam allowing the beam to pass around the mirror support and through the channel; and a mirror coupled to the mirror face of the mirror support such that the mirror and mirror support comprise a light-tight beam block not having any apertures for light to escape therethrough, and wherein when the mirror support having the mirror coupled thereto is in the first position, a normal to the mirror forms an acute angle to the beam path, such that the laser beam is reflected away from the beam path when it strikes the mirror.

2. The beam shutter of claim 1, further comprising an actuator coupled to the mirror support for rotating the mirror support into the first position that interrupts the beam and reflects the beam at said acute angle, and a second position that allows the beam to propagate past the reflective surface unimpeded.

3. The beam shutter of claim 1, wherein said entry face is oriented at an angle of between 10 and 80 degrees with respect to the beam path which corresponds at least approximately with an axis of the channel.

4. The beam shutter of claim 1, wherein said mirror support has a seal located on a rear side, opposite the mirror, said seal being configured to seal the channel in the support base when the mirror support is in the first position such that the connection between the mirror support and the support base is light tight.

5. The beam shutter of claim 1, further including an adapter port to permit connection of a tool for receiving the laser beam upon reflection.

6. The beam shutter of claim 5, wherein said adapter port has an interlock circuit which precludes the laser from operating when there is no tool coupled to the port.

7. The beam shutter of claim 5, wherein said tool includes a beam dump.

8. The beam shutter of claim 5, wherein said tool includes a view port.

9. The beam shutter of claim 5, wherein said tool includes a beam profiler.

10. The beam shutter of claim 5, wherein said tool includes a power meter.

11. The beam shutter of claim 5, wherein said tool includes a photo diode.

12. The beam shutter of claim 5, wherein said tool includes a wavemeter.

13. The beam shutter of claim 1, further including a drive motor for moving the rr support between the first and second positions.

14. The beam shutter of claim 13, wherein said drive motor has a rotatable drive element.

15. The beam shutter of claim 14, further including a linkage coupling the drive motor to the mirror support.

* * * * *